H. N. FRENCH.
BUSINESS FINANCIAL BOOK.
APPLICATION FILED NOV. 23, 1911.

1,068,885.

Patented July 29, 1913.

UNITED STATES PATENT OFFICE.

HERBERT NOEL FRENCH, OF WEST KIRBY, ENGLAND.

BUSINESS FINANCIAL BOOK.

1,068,885.     Specification of Letters Patent.     Patented July 29, 1913.

Application filed November 23, 1911. Serial No. 661,980.

*To all whom it may concern:*

Be it known that I, HERBERT NOEL FRENCH, a subject of the King of England, residing at West Kirby, in the county of Chester, England, have invented certain new and useful Improvements in and Connected with Business Financial Books, of which the following is a specification.

This invention has reference to financial books used in businesses of various kinds, for the keeping of accounts, such for instance as "cash books", and especially those cash books which are adapted or used for entering sums paid out by checks, or entered as received on formal receipts, invoices, and the like; the chief object being to provide improvements in connection with such books by which the amount of labor expended in entering items, or writing up the books, is rendered less than at present, thus saving time and cost of labor.

The improvements apply both to account books where sheets are bound together in the ordinary way, or in connection with books of the "loose leaf" kind. In connection with each page of the account book, such as a cash book, or sheet, as the case may be (but it may be assumed for convenience to be a book), there is employed a number of blank bank check forms, which overlap one another to a large extent leaving one part or edge of each check, namely the top edge underneath, which is not lapped by the others, and comes in contact with the sheet or page below; and these checks are provided with a space on the front, along this top edge for the reception of the name of the payee, and short columns or divisions for the entry of sums of money for which the check or other document is drawn; and similar to those used, or which may be used, in the book, and coinciding therewith; and if a transfer medium of any suitable kind be introduced between the top of the uppermost check, and the sheet or page of the book, upon which they are laid, when the name of the payee or person and the sum is written along the top of the check or the like, they will also by means of the transfer medium, be written and entered in the cash book, and in their proper places, which may be the usual ones. Thus the actual writing or filling up of the check or the like, effects also the entry of the particulars of the check in the cash book. By this means only about one-third of the amount of entering items or writing up books, which is entailed in the ordinary manner of keeping accounts, is necessary when using this system.

The drawing hereto annexed which illustrates the invention, and in connection with which it will be further described, shows a page of a financial book designed to have entered in it the amounts and checks drawn, with a page or sheet of checks laid over it, and which are to be written out.

In the drawing $a$ generally represents the page of the financial book; and $o$ the sheet or page of blank checks. On the page $a$, it will be seen there are, on the left hand side, columns for the voucher or check numbers and dates; in the middle is the space for receiving the name to whom the checks are made payable; and on the right hand is the column for receiving the amounts of the various checks. These data, viz., the name, date, and amount of money of two checks drawn are shown entered on the sheet. Of the sheet or page of blank checks $o$ which is laid over the page $a$, the two upper checks which have been drawn, and the names of the payees, and the sums for which they were drawn, have been entered on page $a$, are shown removed, that is, torn off from the portion $o^1$, at the left hand side where they are adhered together. The other or main portion of each check at the right hand side of this part, is independent of the other checks; that is they are arranged in the manner of leaves, one upon the other; and when removed, are separated from the parts $o^1$ along the line $o^2$, which is the line along which they are all perforated, so that the bodies can be easily torn off from the stump portions $o^1$ in the well-known way. Of the line $o^2$, the upper portion extending down from the top, to a point upon the uppermost remaining check, is shown as a full line, and represents the inner edges of the stump portions of the two checks referred to, which have been removed. This uppermost check is shown written out along the line at the upper part of it; and this part being above the upper edge of the check next below, if a sheet of transfer paper be between the checks $o$ and the page $a$, the writing of the name and sum on the top line $o^3$, would cause them also to be entered in the name column on page $a$, similarly as they appear on it.

The dot and dash line at the top of the page or sheet of checks $o$, represents the edge of the uppermost check, prior to any of them being torn off.

The horizontal full lines on page *o* shown in the lower half of the drawing, represent the lowermost edges of the overlapping checks; and the amount of underlap shown is equal to the amount of overlap of the successive checks at their upper edges. The sheets *o* can be placed and held on the sheets *a* of the account book or sheets, which are to receive the entries of the checks by any suitable form of clip or holder. The checks may be numbered, and numbers used on the book sheets *a* for the purpose of identification of checks, and entries in any suitable way.

Instead of a separate carbon or like copy or manifolding transfer sheet being placed between the checks and the sheets, as above described, the transfer medium may consist of a carbon substance or the like such as is often used for transfer or manifolding purposes, and may be applied directly to the under side of the top overlapping edges of the checks upon which the particulars referred to, are to be written; and such transfer medium is of such strength that it will only take effect when the pressure is applied directly to the other side of the paper so that only the writing on the top of the check would be transferred to page *a*.

While, as stated, the invention can be applied and used in connection with the ordinary kind of bound account or business books, it can also be used in connection with the loose-leaf system of account or business books of different kinds with very great advantage.

What is claimed is:—

1. In business books and registers, a plurality of forms secured together at their ends and arranged one above the other, with one part of each form extending beyond a part of the top of the next form beneath it, and with a second part of each form extending beyond a part of the next form above it, the vertical edges of all the forms being in alinement, the part of each form which extends beyond the top of the next succeeding form having thereon vertical and horizontal lines, a sheet arranged beneath all the forms with the first mentioned one part of each form arranged next to and in contact with it, said sheet having a plurality of horizontal lines which are in alinement with the horizontal lines on the forms, the sheet also having vertical lines in alinement with the vertical lines on the forms, and a transfer medium interposed between the first mentioned extended part of all the forms and the sheet.

2. In combination, a sheet provided with a series of horizontal spaced lines and a series of spaced vertical lines which cross the horizontal lines and form vertical columns, a plurality of checks laid over the sheet, said checks being secured together at their ends, and each check having a horizontal line substantially in alinement with one of the horizontal lines on the sheet, the checks overlapping, and their free end edges being arranged in vertical alinement and terminating inside the free end edge of the sheet to expose one complete vertical column on said sheet, the top of each check extending over the upper part of the adjacent check, the horizontal lines of said checks being on the overlapping portions and registering successively with the horizontal lines on the said sheet, the overlapping part of all the checks being next to the surface of the sheet, and a transfer medium interposed between the overlapping part of all of the checks and the sheet.

In testimony whereof I have signed my name to this specification in the presence of two subscribing witnesses.

H. NOEL FRENCH.

Witnesses:
SOMERVILLE GOODALL,
JOSEPH D. HUNTER.